(12) United States Patent
Demange et al.

(10) Patent No.: US 10,220,688 B2
(45) Date of Patent: Mar. 5, 2019

(54) INNER BOX FOR A VEHICLE TAILGATE INCLUDING A TECHNICAL PANEL FITTED THERETO

(71) Applicant: Compagnie Plastic Omnium, Lyons (FR)

(72) Inventors: Jean-Yves Demange, Amberieu en Bugey (FR); Philippe Coudron, Caluire et Cuire (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 14/916,065

(22) PCT Filed: Sep. 5, 2014

(86) PCT No.: PCT/FR2014/052203
§ 371 (c)(1),
(2) Date: Mar. 2, 2016

(87) PCT Pub. No.: WO2015/033076
PCT Pub. Date: Mar. 12, 2015

(65) Prior Publication Data
US 2016/0214655 A1  Jul. 28, 2016

(30) Foreign Application Priority Data
Sep. 6, 2013  (FR) .................................... 13 58548

(51) Int. Cl.
*B60J 5/10* (2006.01)
*B60J 5/04* (2006.01)

(52) U.S. Cl.
CPC ............. *B60J 5/101* (2013.01); *B60J 5/0416* (2013.01)

(58) Field of Classification Search
CPC ................................ B60J 5/0416; B60J 5/101
USPC ..................................... 296/146.5, 146.8, 56
See application file for complete search history.

(56) References Cited

U.S. PATENT DOCUMENTS

| 6,637,801 | B1* | 10/2003 | Eustache ................... B60J 5/10 296/106 |
| 7,380,866 | B2 | 6/2008 | Eckhardt et al. |
| 2005/0200159 | A1 | 9/2005 | Eckhart et al. |
| 2005/0212324 | A1 | 9/2005 | Mittermeier et al. |
| 2006/0022486 | A1* | 2/2006 | Kalmbach ................ B60J 5/107 296/146.8 |
| 2006/0191206 | A1 | 8/2006 | Mooney et al. |

(Continued)

FOREIGN PATENT DOCUMENTS

| CN | 203020036 U | 6/2013 |
| EP | 0601286 A1 | 6/1994 |

(Continued)

OTHER PUBLICATIONS

International Search Report PCT/ISA/210 for International Application No. PCT/FR2014/052203 dated Dec. 8, 2014.

(Continued)

*Primary Examiner* — Jason S Morrow
(74) *Attorney, Agent, or Firm* — Harness, Dickey & Pierce, P.L.C.

(57) ABSTRACT

An inner box for a motor vehicle tailgate, comprising a frame and a set of technical elements for components to pass through or be secured to, wherein said technical elements are carried by a technical panel fitted onto said frame.

10 Claims, 3 Drawing Sheets

(56) References Cited

U.S. PATENT DOCUMENTS

| | | | |
|---|---|---|---|
| 2008/0012389 A1 | 1/2008 | Mittermeier et al. | |
| 2011/0061302 A1 | 3/2011 | Barrel et al. | |
| 2011/0074179 A1* | 3/2011 | Kuntze | B60J 5/107 |
| | | | 296/146.6 |
| 2011/0187150 A1* | 8/2011 | Hache | B60J 5/101 |
| | | | 296/146.2 |
| 2016/0176272 A1* | 6/2016 | Rejc | B60J 5/107 |
| | | | 296/146.5 |
| 2016/0347155 A1* | 12/2016 | Kuntze | B60J 5/101 |

FOREIGN PATENT DOCUMENTS

| | | | |
|---|---|---|---|
| FR | 2416809 A1 | | 9/1979 |
| JP | 2008-516833 A | | 5/2008 |
| WO | WO-0185477 A1 | * | 11/2001 |
| WO | WO-2004/060705 A1 | | 7/2004 |
| WO | WO-2007/111788 A1 | | 10/2007 |

OTHER PUBLICATIONS

Written Opinion of the International Searching Authority PCT/ISA/237 for International Application No. PCT/FR2014/052203 dated Dec. 8, 2014.

French Search Report and Written Opinion for French Application No. FR 1358548 dated Apr. 23, 2014.

Japanese Office Action dated Feb. 13, 2018 for corresponding Japanese Application No. 2016-539619.

\* cited by examiner

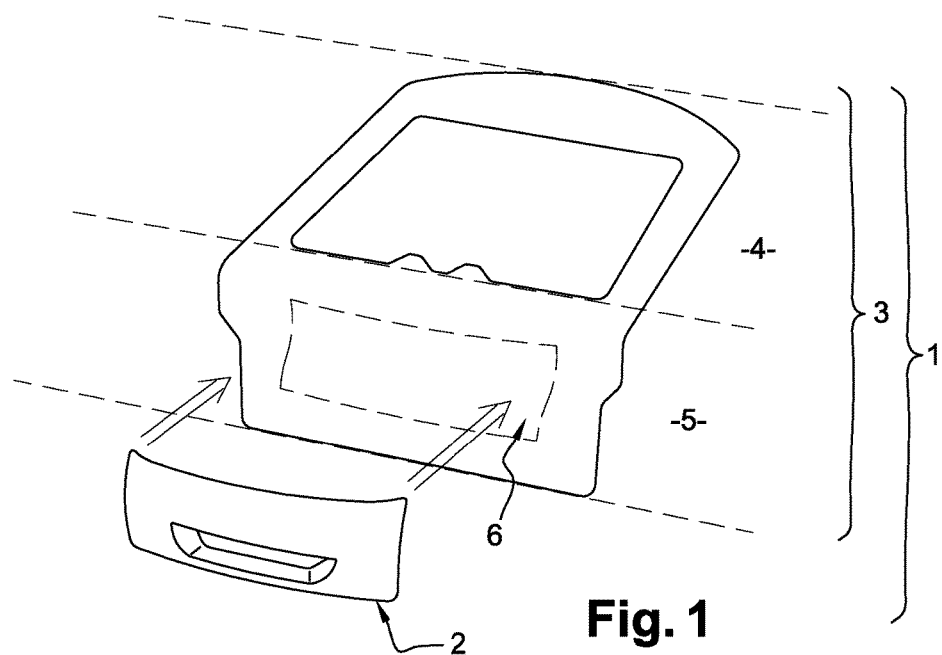
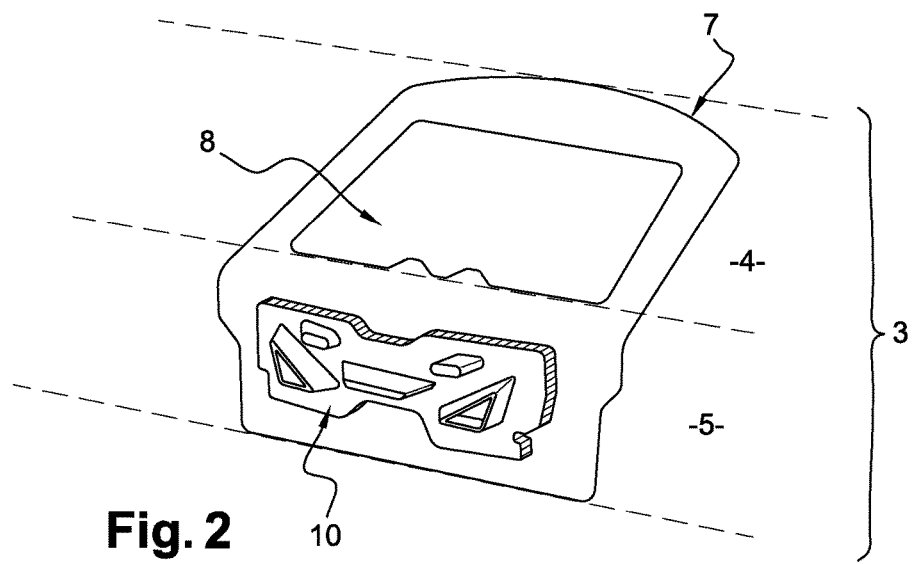

INNER BOX FOR A VEHICLE TAILGATE INCLUDING A TECHNICAL PANEL FITTED THERETO

CROSS-REFERENCE TO RELATED APPLICATIONS

This application is the U.S. National Phase application of PCT Application No. PCT/FR2014/052203 filed on Sep. 5, 2014, which claims priority to French Application No. 1358548 filed on Sep. 6, 2013, the contents of each of which are incorporated herein by reference.

BACKGROUND OF THE INVENTION

The invention relates to the technical field of motor vehicle rear openings, often called tailgates.

A tailgate (1) generally consists of an outer skin (2), forming a single or double block panel, and incorporating all or some of the outer equipment visible from outside the vehicle (light unit, tailgate or rear window opening control, emblem, wash-wipe system, lock, stops, registration plate, etc.) and an inner box (3). FIG. 1 illustrates a tailgate of this type.

An inner box generally consists of:
- an upper portion (4) having an opening designed to accommodate a rear window;
- a lower portion (5), of type "solid panel" (unlike the upper portion) whose central area (6) comprises the following technical elements:
  - holes or openings for components such as wires, linkages, pipes, attachment interfaces to pass through or be secured to;
  - attachment interfaces such as bonding tracks or riveting holes, for systems such as motorised locks or window washer motors, etc.;
  - mechanical strengthening shapes such as ribs or bosses.

Most inner boxes in the state of the art are made of steel. A minority of tailgate inner boxes are made of thermoplastic material.

Thermoplastic is known to have a low elastic limit (start of plastic deformation at low stress) and therefore a relatively low breaking strength and may suffer from mechanical fatigue during use. To guarantee the geometrical strength of a thermoplastic inner box throughout its lifetime, despite the numerous opening and closing operations it undergoes, it is known to add one or more large metal reinforcements to the thermoplastic inner box.

Finally, inner boxes made of a thermoset plastic material are also known. This material provides better resistance to deformation, but has the disadvantage of being more dense than the thermoplastic material.

Furthermore, to produce the central technical panel of an inner box made of a thermoset plastic material, it is necessary to rework the box. Under industrial conditions, especially mass production, it is difficult for thermoset plastic material moulding methods to produce parts with recesses (non-through hole, through-hole, opening, etc.), especially if they are numerous and of small dimensions These recesses, necessary for the integration of functions during assembly, must then be made after moulding, by remachining to remove material, which has many disadvantages: more operations in the manufacturing sequence involving intermediate storage, defects and rejects generated by these machining operations, and in particular dust requiring evacuation and efficient filtering to protect the operators, as well as cleaning of parts, and industrial equipment to prevent clogging.

Moreover, machining an inner box necessarily involves elimination of the functionally unnecessary material, and therefore a loss of expensive material. This loss can be even greater when the machining or its related operations (storage, cleaning, etc.) generate defects requiring the entire box to be scrapped.

Some boxes made of thermoplastic material or steel do not require any rework. However, it may be necessary to modify their technical panel (depending on the vehicle type or range type, for example). In this case, a complete inner box must be manufactured.

SUMMARY

The invention aims to remedy these disadvantages by providing a motor vehicle rear opening whose inner box is made of two portions: a frame and a central technical panel independent of the frame, but mounted and fitted thereto.

Thus, the invention relates to an inner box (3) of a motor vehicle tailgate, comprising a frame (7) and a set of technical elements (11, 12, 13, 14, 15) for components to pass through or be secured to. According to the invention, the technical elements (11, 12, 13, 14, 15) are carried by a technical panel (10) fitted onto the frame (7).

According to one embodiment, the frame (7) comprises in its upper portion (4) a first opening (8) to accommodate a rear window, and in its lower portion (5), a second central opening (9) accommodating the technical panel (10). This embodiment reduces the weight of the inner box for a given technical panel (10).

With the same weight reduction objective, the average thickness of the technical panel (10) can be less than that of the frame (7).

According to another embodiment, the frame (7) is made of a first material and the technical panel (10) is made of a second material.

Preferably, the second material is less dense than the first material. For example, the second material is a thermoplastic material. It can then be selected from the following materials:
- polypropylene (PP);
- polyamide (PA);
- polyethylene (PE);
- acrylonitrile butadiene styrene (ABS);
- polyethylene terephthalate (PET);
- polystyrene (PS);
- polycarbonate (PC);
- polymethylmethacrylate (PMMA);
- as well as all variants and all combinations of these materials or variants.

The raw material may then advantageously be a composite material with thermoset resin, for example a reinforced thermoset material such as SMC or BMC.

According to the invention, the technical panel (10) may integrate by moulding, or be integrally formed with, at least one of the following elements:
- holes (11) for components (12) such as wires, linkages, pipes, attachment interfaces to pass through;
- attachment interfaces (13) for systems such as a motorised lock or a window washer motor;
- mechanical strengthening shapes (14) such as ribs or bosses;
- interfaces (15) for attaching said technical panel (10) to said frame (7) of the inner box (3).

The invention also relates to a motor vehicle tailgate (16) having an inner box (3) according to the invention and an outer skin (2) attached to the inner box (3).

The invention also relates to a method for manufacturing an inner box of a motor vehicle tailgate. According to this method, the following steps are performed:
- providing a frame having in its upper portion a first opening to accommodate a rear window, and in its lower portion a second opening;
- providing a technical panel having a set of technical elements, such as holes for components to pass through or be secured to;
- attaching said panel to said frame.

According to one embodiment of this method, the technical panel is fastened by screwing, bonding, crimping, overmoulding, hollowing out or a combination of these techniques.

BRIEF DESCRIPTION OF THE DRAWINGS

The invention will be better understood on reading the accompanying figures, which are given solely by way of example and not limiting in any way, in which:

FIG. 1 illustrates a tailgate according to the prior art, composed of an outer skin and a single block inner box, i.e. a box integrally formed with the frame.

FIG. 2 illustrates an inner box according to the invention, with a double thickness panel fitted on a frame.

DETAILED DESCRIPTION

Figure 3:
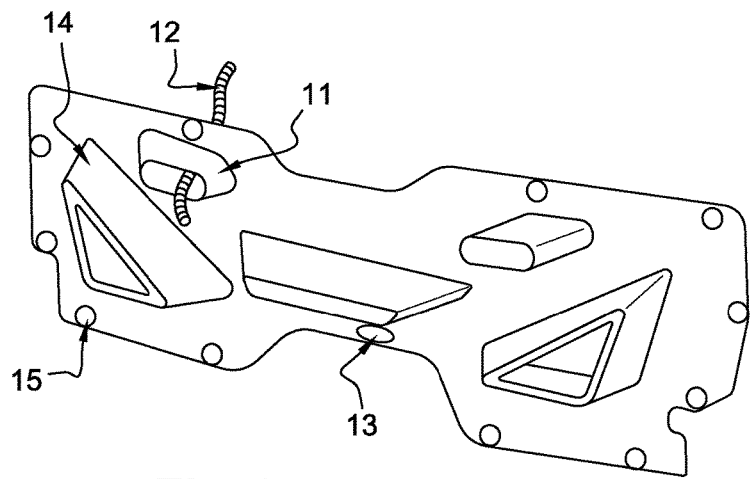
FIG. 3 illustrates a central technical panel according to the invention, fitted on the frame of the inner box.

We now refer to FIG. 2 which illustrates an inner box (3) according to a first embodiment of the invention. It comprises:
- a frame (7) comprising in its upper portion (4), a first opening (8) intended to accommodate a rear window;
- a central technical panel (10) attached to the frame (7) and supporting all the technical elements (11, 12, 13, 14, 15 referenced in FIG. 3), such as holes, for components to pass through or be secured to.

The central technical panel (10) can be attached on top of the lower portion of the frame of the inner box by screwing, bonding, gluing, crimping, overmoulding, inserting, clipping, hollowing out or any combination of these techniques.

Due to its design in two portions, the inner box (3) according to the invention makes it possible to limit remachining operations to a smaller element, which simplifies handling and storage, reduces the size and cost of the rework equipment and in particular avoids defects requiring the entire box (3) to be scrapped.

Figure 4:
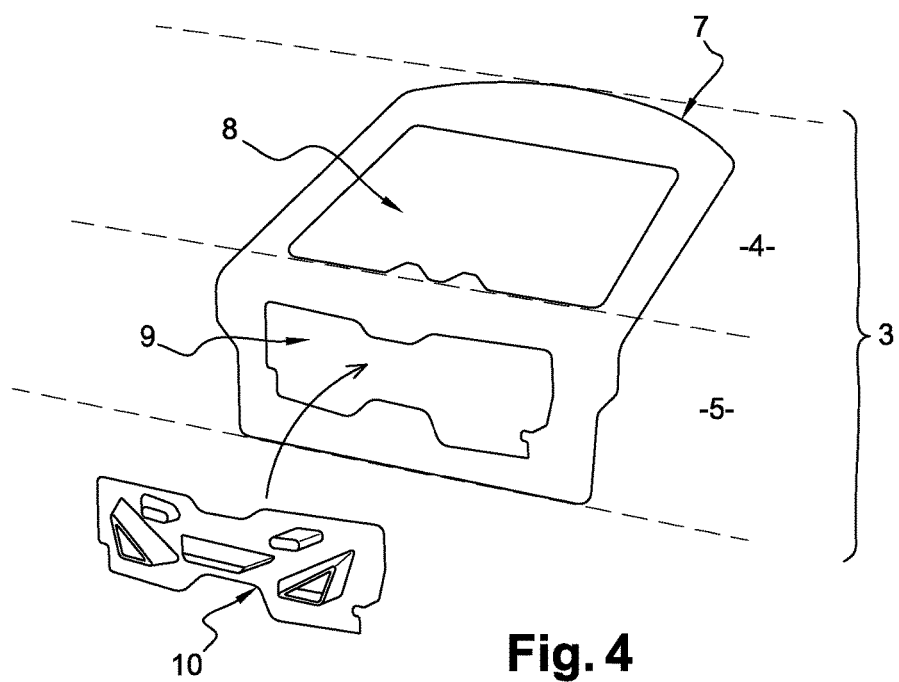
FIG. 4 illustrates an inner box according to the invention, with a panel fitted on the frame at an opening (9).
Figure 5:
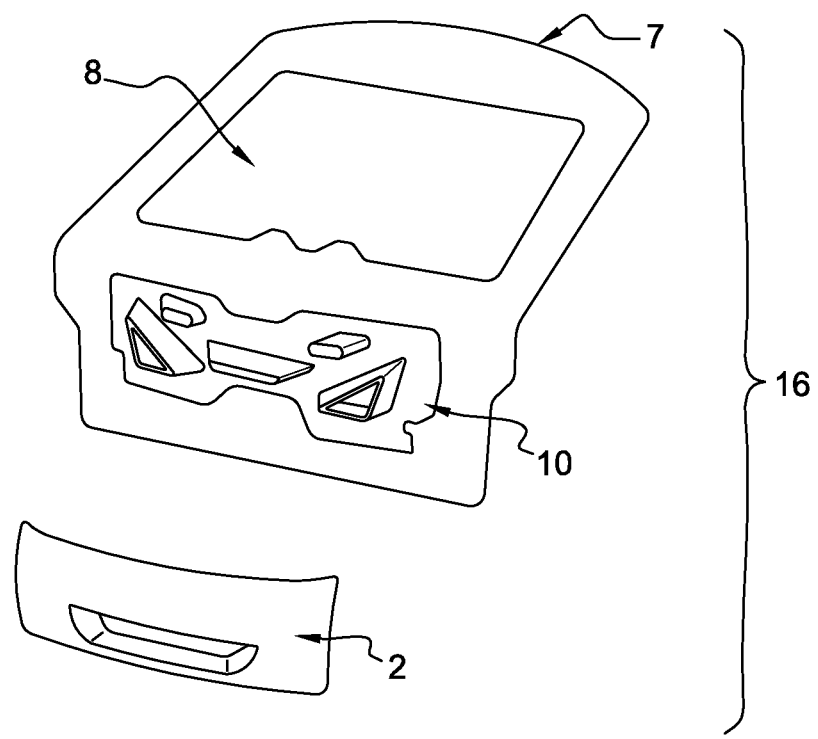
FIG. 5 illustrates a motor vehicle tailgate (16) according to the invention.

According to a second embodiment (illustrated on FIG. 4), the frame of the box has in its upper portion a first opening (8) to accommodate the rear window, and in its lower portion, a second central opening (9) accommodating the technical panel (10).

This embodiment reduces the weight of the inner box for a given technical panel. Adding a technical panel on top of a frame thickness makes the box heavier and makes it more difficult to access the functional interfaces during assembly or during a repair intervention. Forming an opening of size substantially equivalent to that of the technical panel, although slightly smaller, reduces the weight of the inner box.

According to a variant (not shown) of this embodiment, the second opening (9) opens out onto the lower edge of the frame (7). From an 8-shape, the frame (7) then has an A-shape (bottom loop of the "8" open). In this case, the lower physical edge of the inner box (3) is formed by the technical panel (10) itself and no longer by the frame (7).

According to a third embodiment, still carried out to reduce the weight of the inner box, a technical panel (10) is made whose weight makes it possible to lighten the inner box compared with a one-piece box made with an integrated central area (6), integrally formed with the frame as shown on FIG. 1. This weight reduction of the technical panel can be obtained in different ways:

(i) by using the same material for the technical panel and the frame, the technical panel can be made of average thickness less than that of the frame.

For example, a variable thickness can be used for the panel, keeping or adding material only where it is required, to strengthen the panel or position a technical element.

(ii) To reduce the weight of the technical panel, a technical panel made of a material less dense than that of the frame can be used. In this case, the frame is made of a first material and the technical panel is made of a second material less dense than the first material.

Two different grades of the same generic material can be used, such as an SMC of density 1.8 to 2.2 for the frame, and an SMC of density 1.2 to 1.7 for the technical panel, these grades being obtained for example by reducing the reinforcing or filling rate.

Steel or aluminium may also be used for the frame (7) and plastic for the technical panel (10).

A very rigid thermoplastic material, for example with 20% to 50% of glass fibres for the frame (7), and less dense thermoplastic material, for example with only 5% to 10% of glass fibres for the technical panel (10), could also be used.

(iii) Another advantage of the invention is that first and second materials of different types can also be selected:
- the first material, of the frame, can therefore be a composite material, preferably with thermoset resin, comprising reinforcing fillers such as fibres, glass mats or fabrics, or carbon. This composite material has the advantage of making the frame of the inner box very rigid while limiting the weight of this structure. Thermoset materials such as SMC or BMC can be used, for example.
- The second material, of the technical panel fitted, can therefore be a thermoplastic material. It may in particular be selected from the following materials:
  - polypropylene (PP);
  - polyamide (PA);
  - polyethylene (PE);
  - acrylonitrile butadiene styrene (ABS);
  - polyethylene terephthalate (PET);
  - polystyrene (PS);
  - polycarbonate (PC);
  - polymethylmethacrylate (PMMA);
  - as well as all variants (of grades and reinforcements, etc.) and all combinations of these materials, or variants (e.g. ABS/PC).

Thus, according to a preferred embodiment of the invention, the inner box comprises a frame (7) made of filled thermoset material such as SMC or BMC. The frame comprises in its lower portion an opening (9) in which a technical panel (10) made of thermoplastic material, preferably polypropylene, is attached.

The advantage of this solution lies not only in the reduced weight of the inner box but also in the injection moulding of the technical panel (10). Indeed, by using a thermoplastic material, the technical or lightening recesses can be made directly by moulding, instead of by remachining. Thus, the central technical panel (10) integrates by moulding, at least one of the following elements (FIG. 3):

- holes or openings (11) for components (12) such as wires, linkages, pipes, attachment interfaces to pass through;
- attachment interfaces (13) on the system panel, such as motorised locks or window washer motors. For example, gluing tracks or crimping holes;
- mechanical strengthening shapes (14) such as ribs or bosses;
- interfaces (15) for attaching the technical panel on the frame of the inner box (discontinuous attachments (screws, rivets, etc.) or continuous attachments (overmoulding or bonding).

The invention also relates to a motor vehicle tailgate (16) having an inner box according to the invention. This type of tailgate is shown on FIG. 4. It comprises, on top of and attached to the inner box, an outer skin (2) having outer elements visible from outside the vehicle.

The invention also relates to a method for manufacturing the inner box according to the invention. This method includes the following steps, whose order is unimportant:

- providing a frame having in its upper portion a first opening to accommodate a rear window, and in its lower portion a second opening;
- providing separately a technical panel having a set of technical elements, such as holes for components to pass through or be secured to;
- attaching the technical panel to the frame.

The invention claimed is:

1. An inner box for a motor vehicle tailgate, the inner box comprising:
   a frame of the inner box;
   a set of technical elements for components to pass through or be secured to; and
   an outer skin attachable to the frame; wherein:
      said technical elements are carried by a technical panel fitted onto said frame,
      said frame having at an upper portion thereof a first opening configured to accommodate a rear window, and at a lower portion thereof a second central opening configured to receive said technical panel therein,
      said frame being made of a first material and said technical panel being made of a second material less dense than said first material, and
      the outer skin being attachable to the lower portion and covering the technical panel without being attached to the technical panel.

2. Inner box according to claim 1, wherein an average thickness of the technical panel is less than an average thickness of said frame.

3. Inner box according to claim 1, wherein the second material is a thermoplastic material.

4. Inner box according to claim 1, wherein the second material is selected from the following materials:
   polypropylene (PP);
   polyamide (PA);
   polyethylene (PE);
   acrylonitrile butadiene styrene (ABS);
   polyethylene terephthalate (PET);
   polystyrene (PS);
   polycarbonate (PC);
   polymethylmethacrylate (PMMA);
   as well as all variants and all combinations of these materials or variants.

5. Inner box according to claim 1, wherein the first material is a composite material with thermoset resin.

6. Inner box according to claim 5, wherein the first material is one of a SMC reinforced thermoset material and a BMC reinforced thermoset material.

7. Inner box according to claim 1, wherein the technical panel integrates by molding, or is integrally formed with, at least one of the following elements:
   holes for components including at least one of wires, linkages, pipes, and attachment interfaces to pass through;
   attachment interfaces for systems including at least one of a motorized lock and a window washer motor;
   mechanical strengthening shapes including at least one of ribs and bosses;
   interfaces for attaching said technical panel to said frame of the inner box.

8. A method for manufacturing an inner box of a motor vehicle tailgate, the method comprising:
   providing a frame of the inner box, made of a first material, having at an upper portion thereof a first opening to accommodate a rear window, and at a lower portion thereof a second opening;
   providing a technical panel made of a second material less dense that said first material, having a set of technical elements, such as holes for components to pass through or be secured to;
   attaching said technical panel to said frame; and
   attaching an outer skin to the lower portion so as to cover the technical panel without being attached to the technical panel.

9. Method according to claim 8, wherein said technical panel is fastened by screwing, bonding, crimping, overmoulding, hollowing out or a combination of these techniques.

10. The inner box of claim 1, wherein the outer skin is a detachable outer skin.

* * * * *

UNITED STATES PATENT AND TRADEMARK OFFICE
CERTIFICATE OF CORRECTION

PATENT NO. : 10,220,688 B2
APPLICATION NO. : 14/916065
DATED : March 5, 2019
INVENTOR(S) : Jean-Yves Demange and Philippe Coudron Page 1 of 1

It is certified that error appears in the above-identified patent and that said Letters Patent is hereby corrected as shown below:

On the Title Page

Item (73) Assignee should read: Compagnie Plastic Omnium, Lyon (FR)

Signed and Sealed this
Fourteenth Day of May, 2019

Andrei Iancu
*Director of the United States Patent and Trademark Office*